United States Patent
Fay, II

(10) Patent No.: US 11,744,184 B2
(45) Date of Patent: Sep. 5, 2023

(54) ROLL CONDITIONER ADJUSTMENT SYSTEM FOR AN AGRICULTURAL HARVESTING MACHINE

(71) Applicant: CNH Industrial America LLC, New Holland, PA (US)

(72) Inventor: Jeffrey B. Fay, II, Oxford, PA (US)

(73) Assignee: CNH Industrial America LLC, New Holland, PA (US)

( * ) Notice: Subject to any disclaimer, the term of this patent is extended or adjusted under 35 U.S.C. 154(b) by 251 days.

(21) Appl. No.: 17/324,710

(22) Filed: May 19, 2021

(65) Prior Publication Data

US 2021/0360856 A1 Nov. 25, 2021

Related U.S. Application Data

(60) Provisional application No. 63/026,860, filed on May 19, 2020.

(51) Int. Cl.
*A01D 82/02* (2006.01)
*A01D 43/10* (2006.01)

(52) U.S. Cl.
CPC ............ *A01D 82/02* (2013.01); *A01D 43/10* (2013.01)

(58) Field of Classification Search
CPC ....... A01D 82/02; A01D 43/10; A01D 43/102
See application file for complete search history.

(56) References Cited

U.S. PATENT DOCUMENTS 3,513,645 A * 5/1970 Garrett ................... A01D 82/00 56/1
4,472,927 A * 9/1984 Vogt ....................... A01D 82/00 56/DIG. 1

(Continued)

FOREIGN PATENT DOCUMENTS

EP 0835603 A2 4/1998
EP 3400782 A1 11/2018

(Continued)

OTHER PUBLICATIONS

Extended European Search Report for EP Application No. 21174766.2 dated Oct. 15, 2021 (six pages).

*Primary Examiner* — Abigail A Risic
(74) *Attorney, Agent, or Firm* — Peter Zacharias

(57) ABSTRACT

A crop conditioning device for an agricultural harvesting machine. The crop conditioning device includes a frame, a first conditioning roll, and a second conditioning roll. The crop conditioning device also includes a tension member operably connected to the second conditioning roll. The tension member is configured for applying a tension force on the second conditioning roll. The crop conditioning device also includes a tension actuator operably connected to the tension member. The tension actuator is configured for adjusting the tension force applied by the tension member. The crop conditioning device also includes a pair of control rods respectively connected to the pair of lateral ends of the second conditioning roll. The crop conditioning device also includes a pair of roll-gap actuators respectively and operably connected to the pair of control rods. The pair of roll-gap actuators are configured for pivoting the second conditioning roll to adjust the roll gap.

14 Claims, 9 Drawing Sheets

(56) References Cited

U.S. PATENT DOCUMENTS

| | | | | |
|---|---|---|---|---|
| 5,033,257 | A * | 7/1991 | Walters | A01D 43/107 100/169 |
| 5,435,239 | A * | 7/1995 | Talbot | A01D 82/02 99/523 |
| 5,531,062 | A * | 7/1996 | Pfrimmer | B02C 4/32 56/10.2 J |
| 6,050,070 | A * | 4/2000 | Cook | A01D 82/00 56/16.4 C |
| 6,131,837 | A * | 10/2000 | Wanner | A01D 43/086 241/294 |
| 6,425,232 | B1 * | 7/2002 | Desnijder | A01D 82/02 56/16.4 B |
| 6,499,283 | B1 * | 12/2002 | Cook | A01D 82/02 56/16.5 |
| 6,715,271 | B2 * | 4/2004 | Mellin | A01D 82/00 56/16.4 B |
| 8,056,309 | B2 | 11/2011 | Vandendriessche | |
| 8,056,311 | B1 * | 11/2011 | Barnett | A01D 82/00 56/16.4 B |
| 9,648,809 | B2 | 5/2017 | Pruitt et al. | |
| 11,477,941 | B2 * | 10/2022 | Bode Mortensen | A01D 43/102 |
| 2006/0123759 | A1 * | 6/2006 | Fox | A01D 82/02 56/16.4 C |
| 2008/0261670 | A1 | 10/2008 | Potthast | |
| 2015/0129698 | A1 | 5/2015 | Olson et al. | |
| 2018/0325029 | A1 * | 11/2018 | Rotole | A01D 57/26 |
| 2018/0325032 | A1 * | 11/2018 | Rotole | G05D 1/0278 |
| 2018/0328470 | A1 | 11/2018 | Rotole et al. | |
| 2019/0116733 | A1 | 4/2019 | Wire et al. | |
| 2020/0205345 | A1 * | 7/2020 | Bollinger | A01D 57/26 |
| 2023/0038553 | A1 * | 2/2023 | Steidinger | A01D 82/00 |

FOREIGN PATENT DOCUMENTS

| | | |
|---|---|---|
| EP | 3451818 B1 | 2/2021 |
| FR | 1239827 A | 8/1960 |

* cited by examiner

ROLL CONDITIONER ADJUSTMENT SYSTEM FOR AN AGRICULTURAL HARVESTING MACHINE

BACKGROUND OF THE INVENTION

The present invention pertains to agricultural harvesting machines and, more specifically, to a roll-type conditioner for an agricultural harvesting machine.

Agricultural harvesting machines may include self-propelled windrowers or pull-type mower conditioners. Farmers may operate such mowing devices to cut crop material, such as hay or grass, from a field and subsequently deposit the cut crop into windrows on the field. The windrows may be left on the field to dry out the crop in the sun. Thereafter, farmers may bale the cut crop material with a baler, such as a large square baler or round baler, which straddles the windrows and travels along the windrows to pick up the crop material and form it into bales.

A typical self-propelled windrower includes a chassis, a prime mover, wheels, and a detachable header. The header generally includes a cutter bar and a conditioner assembly. The cutter bar can be a rotary cutter bar with rotating discs or a sickle-type cutter bar with reciprocating knives.

A typical pull-type mower conditioner includes a frame, a hitch coupled to the towing vehicle, a cutter bar, and a conditioner assembly. The mower conditioner may further include other elements such as a reel to assist crop feeding and an auger or belts to convey crop to a central discharge point.

A conditioner assembly of a self-propelled windrower or pull-type mower conditioner generally includes two or more conditioning rolls for conditioning the crop material. The conditioning rolls are located adjacent to one another such that a gap forms therebetween. This gap in between the paired conditioning rolls helps to define the size of the crop mat which passes therethrough. As the crop passes through this gap, the conditioning rolls apply opposing tangential forces that condition or otherwise crush the crop material. The extent of conditioning is based in part on the size of the gap and the tension holding the conditioning rolls in place. Overtime, the surface of the conditioning rolls will wear, thus increasing the size of the gap and causing suboptimal conditioning of the crop material. As can be appreciated, suboptimal conditioning may negatively impact the drying time of the cut crop, tonnage, and/or feed quality.

Current conditioning assemblies require an operator to manually set the gap size and tension of the conditioning rolls. The gap size can be set by adjusting a nut on a limiting rod coupled to one of the conditioning rolls. The tension can be set by turning a crank that variably biases one conditioning roll toward the other conditioner roll. However, it may be difficult for the operator to manually adjust these parameters, especially if certain components have become corroded or stuck due to crop buildup. Also, such adjustments may not be able to be accurately verified since the operator may not be able to visually inspect the gap size or roll tension. Thereby, the manual adjustment of the conditioning rolls can be difficult, time-consuming, and potentially inaccurate.

What is needed in the art is a cost-effective and easy-to-adjust crop conditioner.

SUMMARY OF THE INVENTION

In one exemplary embodiment formed in accordance with the present invention, there is provided a crop conditioning device for an agricultural harvesting machine. The crop conditioning device includes a frame, a first conditioning roll and a second conditioning roll, a tension member, a tension actuator for adjusting the tension force applied by the tension member, a pair of control rods, and a pair of roll-gap actuators for pivoting the second conditioning roll to adjust the roll gap.

In another exemplary embodiment formed in accordance with the present invention, there is provided a crop conditioning device for an agricultural harvesting machine. The crop conditioning device includes a frame, a first conditioning roll connected to the frame, and a second conditioning roll pivotally connected to the frame such that the second conditioning roll is movable relative to the first conditioning roll. The second conditioning roll is located at a distance away from the first conditioning roll for defining a roll gap in between the first conditioning roll and the second conditioning roll. The second conditioning roll includes a pair of lateral ends. The crop conditioning device also includes a tension member operably connected to the second conditioning roll. The tension member is configured for applying a tension force on the second conditioning roll. The crop conditioning device also includes a tension actuator operably connected to the tension member. The tension actuator is configured for adjusting the tension force applied by the tension member. The crop conditioning device also includes a pair of control rods respectively connected to the pair of lateral ends of the second conditioning roll. The crop conditioning device also includes a pair of roll-gap actuators respectively and operably connected to the pair of control rods. The pair of roll-gap actuators are configured for pivoting the second conditioning roll to adjust the roll gap.

In yet another exemplary embodiment formed in accordance with the present invention, there is provided an agricultural harvester that includes a chassis and a header connected to the chassis. The header includes a cutter bar configured for cutting a crop material from a field and a crop conditioning device configured for conditioning the crop material. The crop conditioning device includes a frame, a first conditioning roll connected to the frame, and a second conditioning roll pivotally connected to the frame such that the second conditioning roll is movable relative to the first conditioning roll. The second conditioning roll being located at a distance away from the first conditioning roll for defining a roll gap in between the first conditioning roll and the second conditioning roll. The second conditioning roll includes a pair of lateral ends. The crop conditioning device also includes a tension member operably connected to the second conditioning roll. The tension member is configured for applying a tension force on the second conditioning roll. The crop conditioning device also includes a tension actuator operably connected to the tension member. The tension actuator is configured for adjusting the tension force applied by the tension member. The crop conditioning device also includes a pair of control rods respectively connected to the pair of lateral ends of the second conditioning roll. The crop conditioning device also includes a pair of roll-gap actuators respectively and operably connected to the pair of control rods. The pair of roll-gap actuators are configured for pivoting the second conditioning roll to adjust the roll gap.

In yet another exemplary embodiment formed in accordance with the present invention, there is provided a mower conditioner configured for being towed behind an agricultural vehicle. The mower conditioner includes a cutter bar configured for cutting a crop material from a field and a crop conditioning device configured for conditioning the crop material. The crop conditioning device includes a frame, a first conditioning roll connected to the frame, and a second conditioning roll pivotally connected to the frame such that the second conditioning roll is movable relative to the first conditioning roll. The second conditioning roll is located at a distance away from the first conditioning roll for defining a roll gap in between the first conditioning roll and the second conditioning roll. The second conditioning roll includes a pair of lateral ends. The crop conditioning device also includes a tension member operably connected to the second conditioning roll. The tension member is configured for applying a tension force on the second conditioning roll. The crop conditioning device also includes a tension actuator operably connected to the tension member. The tension actuator is configured for adjusting the tension force applied by the tension member. The crop conditioning device also includes a pair of control rods respectively connected to the pair of lateral ends of the second conditioning roll. The crop conditioning device also includes a pair of roll-gap actuators respectively and operably connected to the pair of control rods. The pair of roll-gap actuators are configured for pivoting the second conditioning roll to adjust the roll gap.

One possible advantage of the exemplary embodiment of the crop conditioning device is that the tension force and the roll gap size can be automatically adjusted without manual intervention.

Another possible advantage of the exemplary embodiment of the crop conditioning device is that the upper conditioning roll can float during operation while still being efficiently and independently tensioned and pivoted due to the geometry of the system, wherein the roll-gap actuators are respectively operably connected to the tension arms through the control rods.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
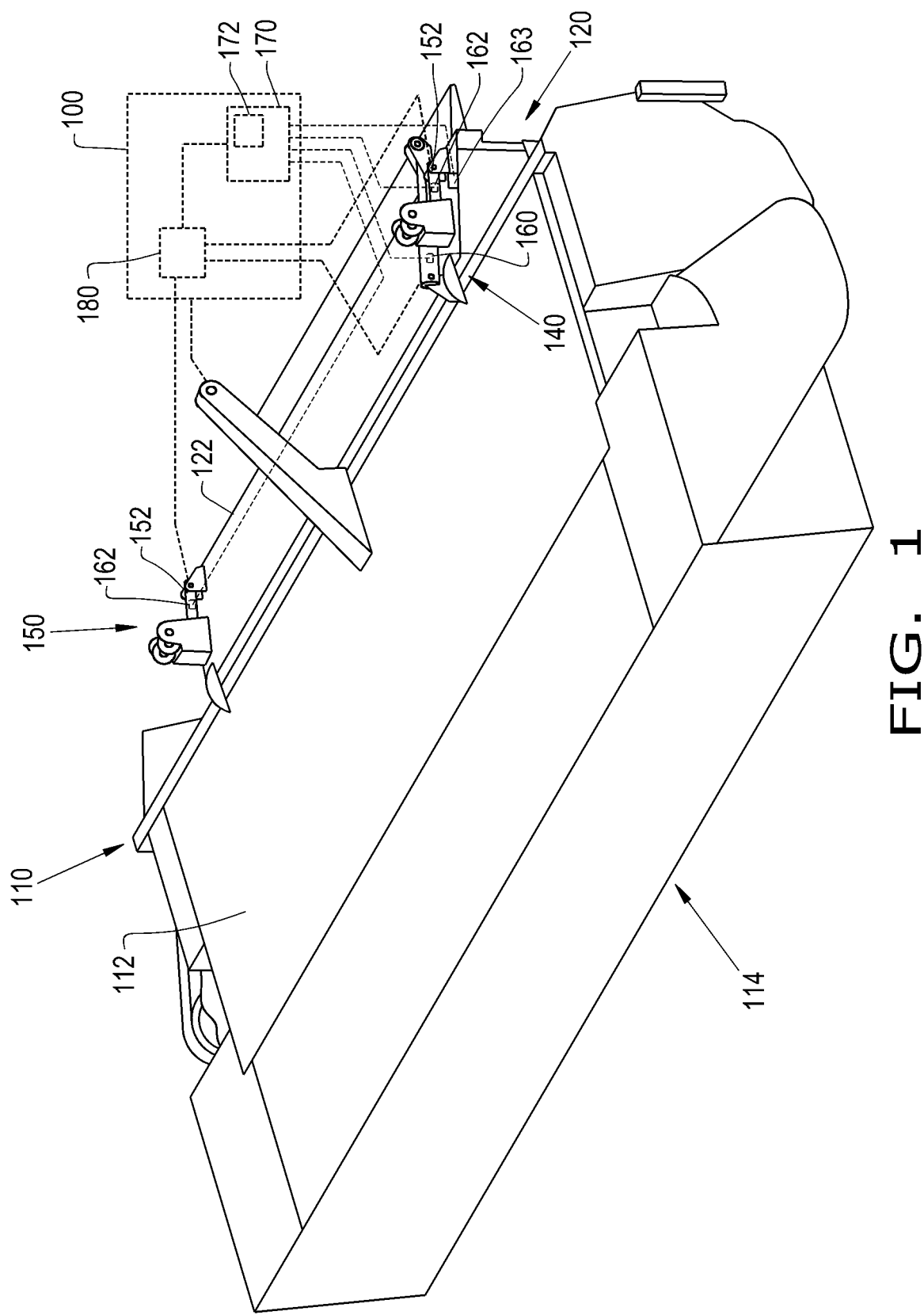
FIG. 1 illustrates a perspective view of an exemplary embodiment of a header for an agricultural harvester, the header including a crop conditioning device, in accordance with an exemplary embodiment of the present invention.

The terms "forward", "rearward", "left" and "right", when used in connection with the agricultural harvester or mowing device and/or components thereof are usually determined with reference to the direction of forward operative travel, but they should not be construed as limiting. The terms "longitudinal" and "transverse" are determined with reference to the fore-and-aft direction of the agricultural vehicle or mowing device and are equally not to be construed as limiting. The terms "downstream" and "upstream" are determined with reference to the intended direction of crop material flow during operation, with "downstream" being analogous to "rearward" and "upstream" being analogous to "forward." The term "agricultural harvesting machine" may refer to any desired machine which cuts crop material from a field, such as a self-propelled windrower or a mower conditioner. The term "crop conditioning device" may refer to a roll-type conditioner that is usable in a self-propelled windrower, a pull-type mower conditioner, or any other desired machine.

Referring now to the drawings, and more particularly to FIGS. 1-7, there is shown an agricultural harvester 100 which generally includes a chassis, a prime mover, wheels and/or tracts, a cab for housing the operator, an optional reel, and a header 110 removably connected to and supported by the chassis. The agricultural harvester 100 may be in the form of any desired agricultural vehicle, such as a self-propelled windrower.

The header 110 may cut the crop from the field, condition the crop material, and deposit the conditioned crop material back onto the field in a windrow or swath. The header 110 generally includes a main frame 112, a cutter bar 114, a crop conditioning device 120, and an exit gate with swath forming shields.

The cutter bar 114 cuts the crop from the field. The cutter bar 114 may be located at the front of the main frame 112. The cutter bar 114 may be in the form of any desired cutter bar 114, such as a sickle bar or rotary disc cutter bar. For example, cutter bar 114 may be in the form of a rotary disc cutter bar with multiple cutting disc heads.

The crop conditioning device 120 may condition or otherwise crush the crop material to decrease the drying time of the crop material on the field. The crop conditioning device 120 may be located rearwardly, i.e., downstream, of the cutter bar 114. The crop conditioning device 120 generally includes a subframe 122, at least two conditioning rolls 124, 126 connected to the subframe 122, a tension mechanism 140, and a roll-gap mechanism 150. The crop conditioning device 120 may also include one or more sensors 160, 161, 162, 163 which may measure the tension force on the conditioning roll 126 and the size of the roll gap RG in between the paired conditioning rolls 124, 126, and a controller 170 that can automatically set and/or adjust the tension force on the conditioning roll 126 and the roll gap RG.

The subframe 122 may be connected to the main frame 112. The subframe 122 mounts the conditioning rolls 124, 126. The subframe 122 may comprise one or more sheet metal panels, including a top panel and lateral side panels. However, the subframe 122 may comprise any desired material. It should be appreciated, the subframe 122 may be a monolithic or a multicomponent frame.

Figure 2:
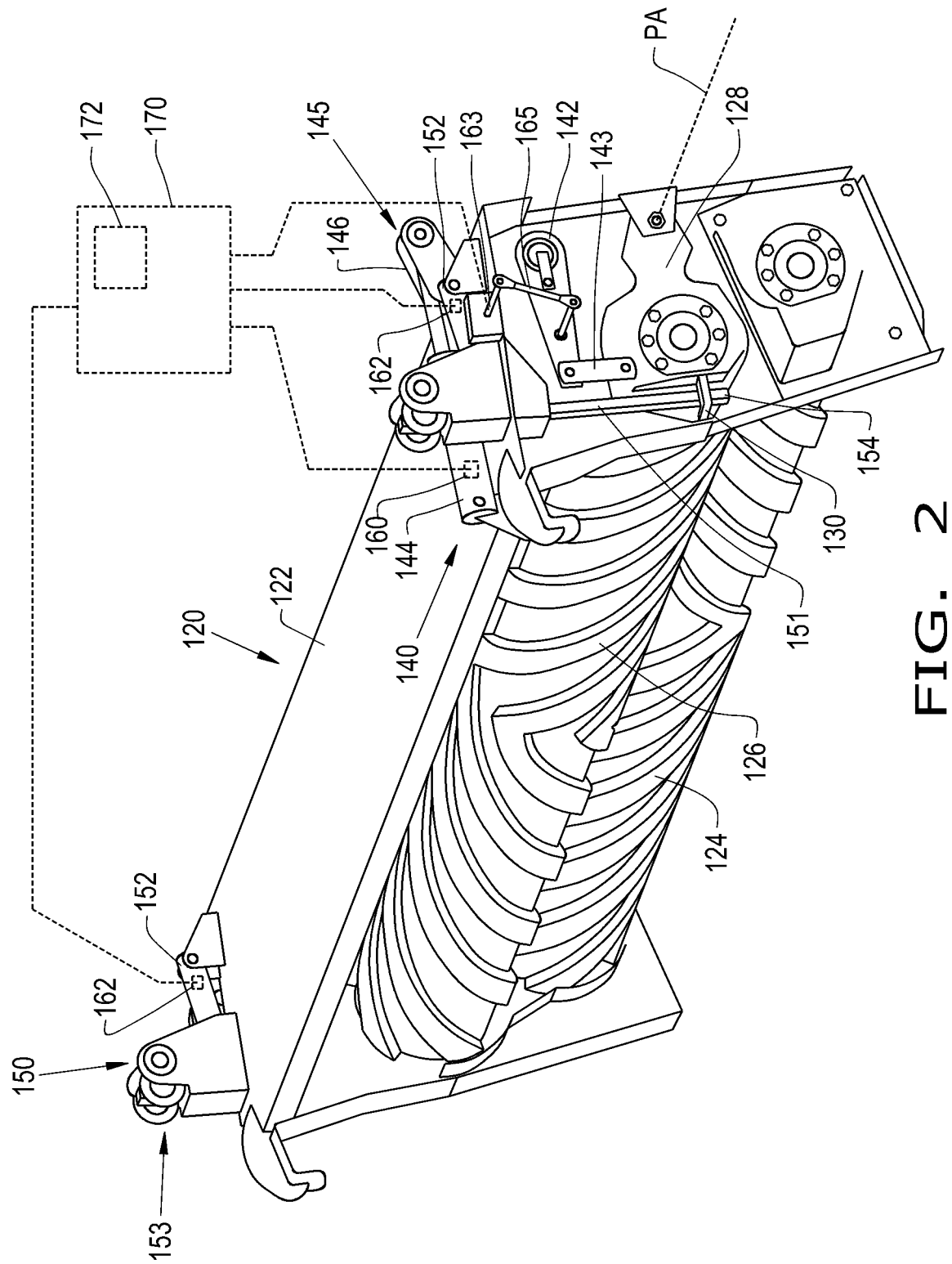
FIG. 2 illustrates a perspective view of the crop conditioning device of FIG. 1, the crop conditioning device including a subframe, conditioner rolls, a tension mechanism, and a roll-gap mechanism.
Figure 3:
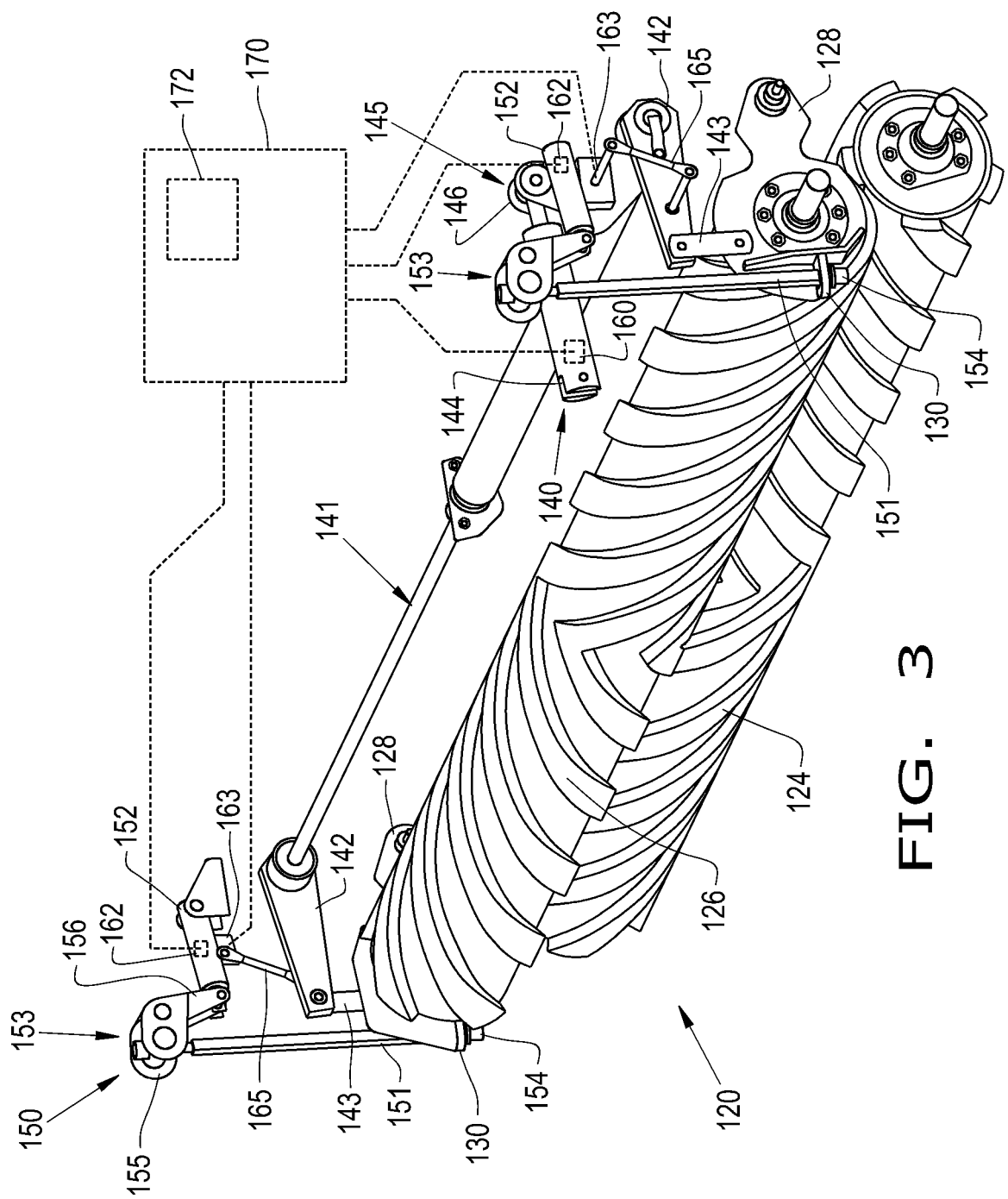
FIG. 3 illustrates a perspective view of the crop conditioning device of FIGS. 1-2 without the subframe.
Figure 7:
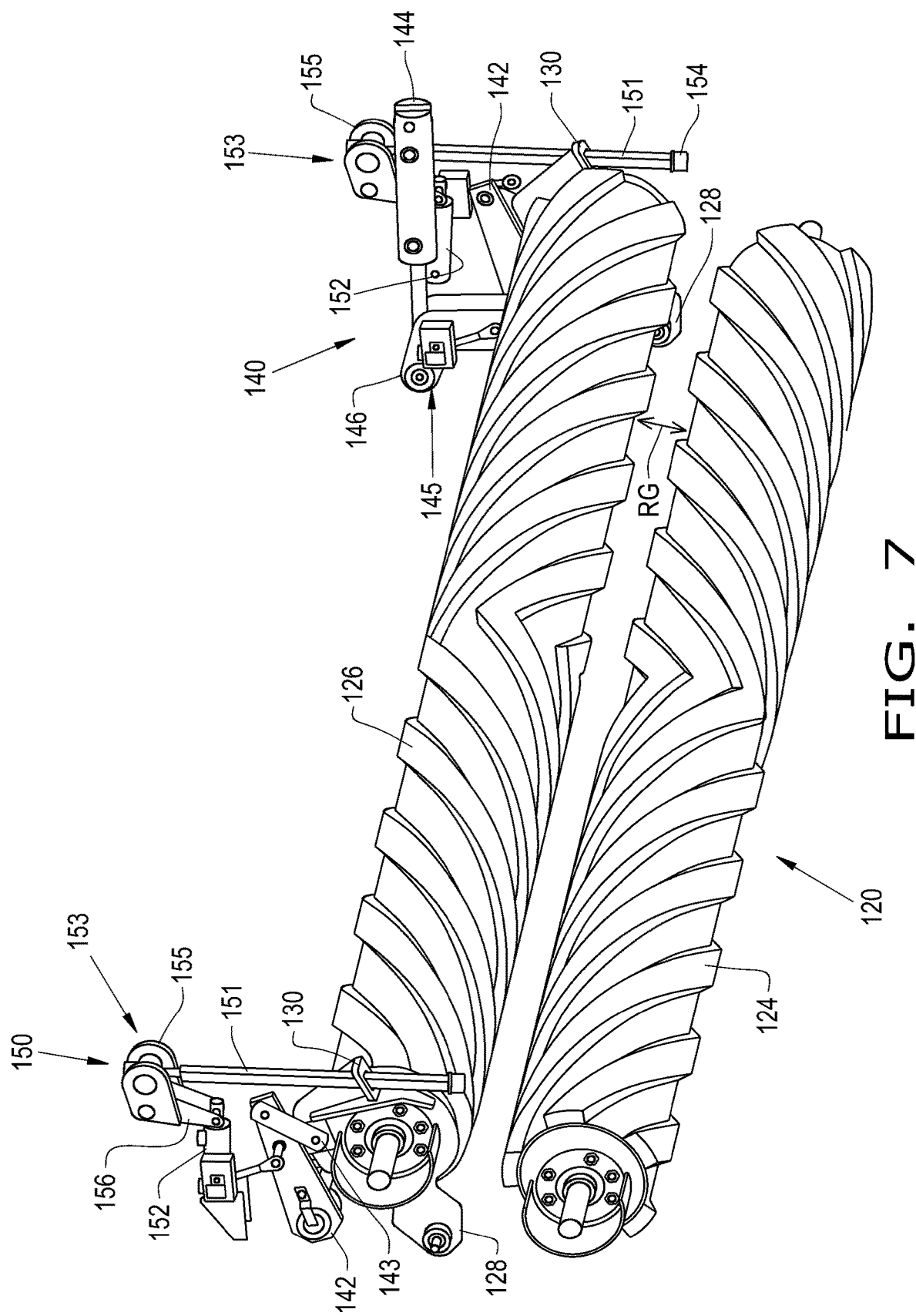
FIG. 7 illustrates a perspective view of the crop conditioning device of FIGS. 1-6, wherein the upper conditioning roll is in a maximum float or open position which is created by the crop mat passing in between the conditioning rolls.

The at least two conditioning rolls 124, 126 may rotate in opposite directions for guiding a mat of crop material through the roll gap RG, as most clearly shown in FIG. 7. The lower conditioning roll 124 may be rotatably and rigidly connected to the subframe 122. In other words, the lower conditioning roll 124 may rotate relative to the subframe 122 but its axis of rotation remains fixed at a given location since it is rigidly connected to the subframe 122. The upper conditioning roll 126 may be rotatably and pivotally connected to the subframe 122. In other words, the upper conditioning roll 126 may rotate relative to the subframe 122 about its axis of rotation, and the upper conditioning roll 126 may also pivot such that that its axis of rotation translates upwardly or downwardly in order to adjust the size of the roll gap RG. Thus, the upper conditioning roll 126 is movable relative to the lower conditioning roll 124. As can be appreciated, the lateral distance in between the surfaces of the lower and upper conditioning rolls 124, 126 defines the size of the roll gap RG. Each lateral end of the upper conditioning roll 126 has an end bracket 128, which pivotally mounts the upper conditioning roll 126 to the subframe 122 at a pivot axis PA (FIG. 2). Each end bracket 128 also includes a one-way slider coupling 130 for operably connecting the upper conditioning roll 126 to the roll-gap mechanism 150. It should be appreciated that the lower conditioning roll 124 may be movable instead of or in addition to the upper conditioning roll 126.

The tension mechanism 140 generally includes a tension member 141, tension arms 142, 143, a tension actuator 144 operably connected to the tension member 141 by a linkage mechanism 145, and a biasing member (unnumbered). The tension mechanism 140 sets and adjusts the tension force on the upper conditioning roll 126.

The tension member 141 may be rotated by the tension actuator 144 for applying a desired tension or biasing force onto the tension arms 142, 143, which in turn transmits the tension force onto the upper conditioning roll 126. The tension member 141 is operably connected to the upper conditioning roll 126 by way of the tension arms 142, 143. The tension member 141 may be located above the upper conditioning roll 126. The tension member 141 may be substantially parallel to the upper conditioning roll 126. The tension member 141 may be in the form of a tension or torsion tube. Alternatively, the tension member 141 may be in the form of any desired elongated member(s), such as a multi-section bar. Since the tension member 141 couples the tension arms 142, 143 together, the tension member 141 controls the rotational position of the tension arms 142, 143. The tension member 141 may comprise any desired material, such as stainless steel.

The tension arms 142, 143 operably connect the tension member 141 to the upper conditioning roll 126. The tension arms 142, 143 may include rigid arms 142 and pivot arms 143. The rigid arms 142 are respectively connected to each end of the tension member 141. The pivot arms 143 are respectively and pivotally connected in between the rigid arms 142 and the lateral ends, i.e., end brackets 128, of the upper conditioning roll 126. The tension arms 142, 143 may be in the form of any desired arms, links, or bars. The tension arms 142, 143 may comprise any desired material.

The tension actuator 144 rotates tension member 141 in order to adjust the tension force applied by the tension member 141 onto the upper conditioning roll 126. The tension actuator 144 is operably connected to the tension member 141 via the linkage mechanism 145. The tension actuator 144 may dually adjust the tension force on the upper conditioning roll 126 and the roll gap RG. In other words, due to the geometry of the tension mechanism 140, tension actuation may rotate the tension arms 142, 143 from a maximum roll tension position to a minimum roll tension position, i.e., maximum roll gap opening setting. In the maximum roll tension position, the conditioning rolls 124, 126 are pushed together with maximum tension member 141 rotation which may in turn minimize the roll gap RG. In the minimum roll tension position, the tension arms 142, 143 are rotated to pull the conditioning rolls 124, 126 away from one another which may in turn fully open the roll gap RG. Hence, the tension actuator 144 may rotate the tension arms 142, 143 in a first direction to apply roll tension to the conditioning rolls 124, 126 or a second direction to lift the upper conditioner roll 126 to the position of maximum roll opening, which may be equal to the maximum roll opening possible. This maximum roll opening may be greater than the typical opening from standard operational settings. The tension actuator 144 may be in the form of any desired actuator such as a linear actuator or rotary motor. For example, the tension actuator 144 may be in the form of a hydraulic cylinder 144.

The linkage mechanism 145 converts a linear movement of the tension actuator 144 into a rotational movement for rotating the tension member 141. The linkage mechanism 145 may include one or more links 146. For instance, the linkage mechanism 145 may include a single link 146 that is pivotally connected to the tension actuator 144 at one end and rigidly connected to the tension member 141 at the other end. The link 146 may include an approximate "L"-shape. It should be appreciated that the one or more links 146 may comprise any desired linkage members and any desired material.

The roll-gap mechanism 150 generally includes control rods 151 and roll-gap actuators 152 that are operably connected to the control rods 151 via linkage mechanisms 153. The roll-gap mechanism 150 sets and adjusts the size of the roll gap RG.

The control rods 151 control the sliding or floating movement of the upper conditioning roll 126. The control rods 151 extend vertically in between the linkage mechanisms 153 and the upper conditioning roll 126. The control rods 151 are respectively pivotally connected to the linkage mechanisms 153 at their upper ends. The control rods 151 are respectively and slidably connected to the lateral ends, i.e., end brackets 128, of the upper conditioning roll 126 at their lower ends. More particularly, each control rod 151 extends through an opening of a respective slider coupling 130. Furthermore, each control rod 151 has an end member 154 that engages with the bottom of the respective slider coupling 130. Hence, each end member 154 defines a mechanical stop for setting a bottom limit of travel of the upper conditioning roll 126. In this regard, the structural relationship between the slider couplings 130 and the end members 154 define a one-way floating or sliding movement of the upper conditioning roll 126. Thus, the control rods 151 allow the upper conditioning roll 126 to upwardly float relative to its end members 154 and independent of the roll-gap actuators 152 (FIG. 7). Yet, the substantially vertical travel of control rods 151, through actuation of the roll-gap actuators 152, allows the end members 154 to raise or lower the slider couplings 130 and thereby pivot the upper conditioning roll 126. The control rods 151 may be in the form of any desired rods, bars, or links. The end members 154 may be in the form of any desired members that have a greater width or circumference than the body of control rods 151 for engaging with the slider couplings 130. For example, the end members 154 may be in the form of nuts or bulbous end-caps. The control rods 151 may comprise any desired material.

Figure 6:
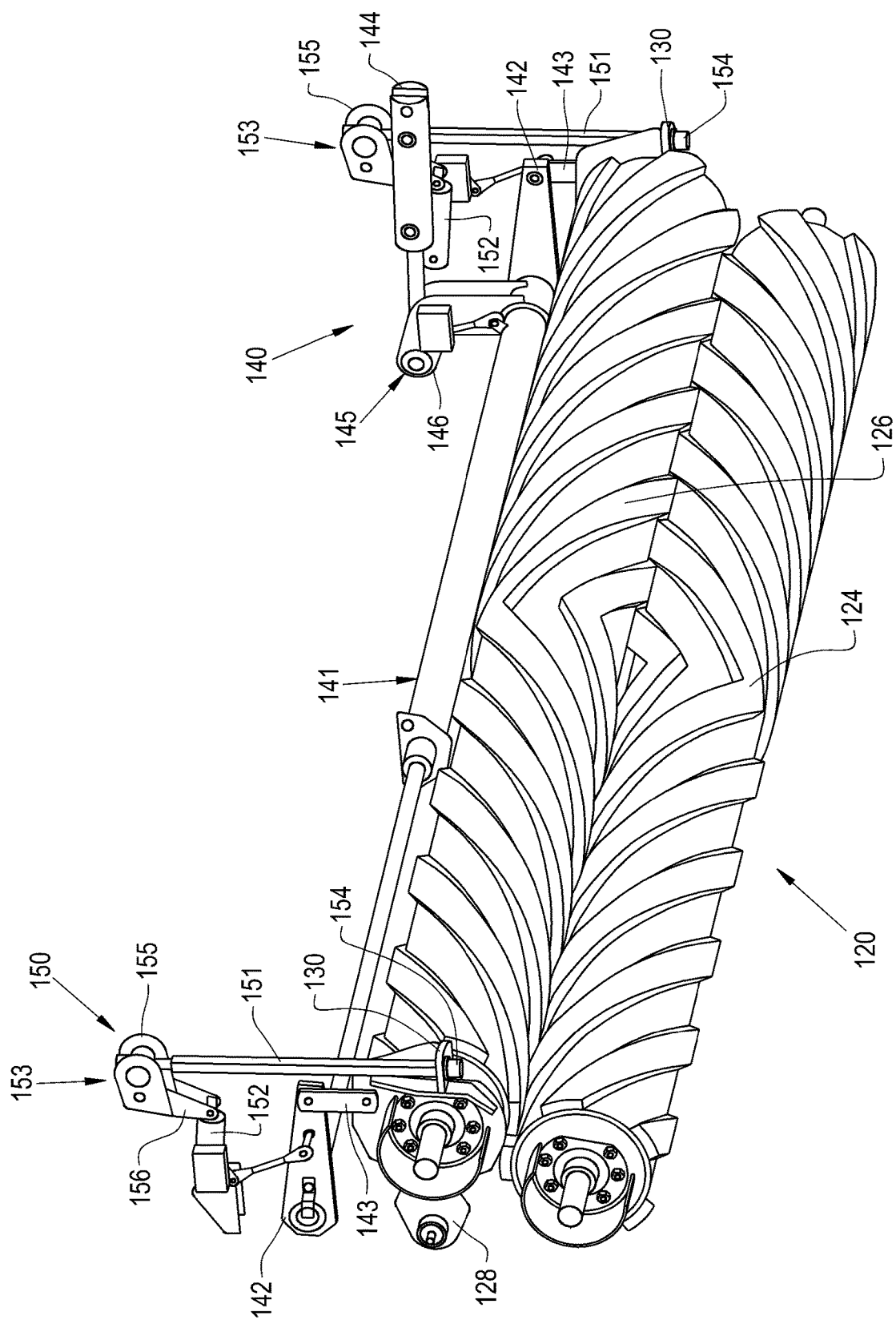
FIG. 6 illustrates a perspective view of the crop conditioning device of FIGS. 1-5, wherein the roll-gap mechanism has set a minimum roll gap size.

The roll-gap actuators 152 may pivot the upper conditioning roll 126 about its axis PA in order to adjust the roll gap RG. Thereby, the roll-gap actuators 152 may pivot the upper conditioning roll 126 in between a maximum roll gap size (FIG. 5) and a minimum roll gap size (FIG. 6). Each roll-gap actuator 152 is mounted on the subframe 122 at one end and is operably connected to a respective control rod 151 via a linkage mechanism 153 at the other end. The roll-gap actuators 152 are respectively connected to the tension arms 142, 143 only through the control rods 151. The roll-gap actuators 152 are located above, i.e., vertically upward of, the tension arms 142, 143. The roll-gap actuators 152 are independently movable for tilting the upper conditioning roll 126 in a non-parallel configuration relative to the lower conditioning roll 124. In other words, the roll-gap actuators 152 can set the roll gap RG to be at different positions on the left-hand side and the right-hand side of the conditioning rolls 124, 126. Thus, the roll-gap actuators 152 may accommodate an uneven wear on one or both of the conditioning rolls 124, 126. Each roll-gap actuator 152 may be in the form of any desired actuator, such as a linear actuator or a rotary motor. For example, each roll-gap actuator 152 may be in the form of a hydraulic cylinder 152.

As can be appreciated, if the actuators 144, 152 are configured as hydraulic cylinders 144, 152, the crop conditioning device 120 may further include a hydraulic system 180 to independently control the extension and retraction of the hydraulic cylinders 144, 152 (FIG. 1). Hence, the hydraulic system 180 can be fluidly connected to the actuators 144, 152 of the tension and roll-gap mechanisms 140, 150. The hydraulic system 180 may also be operably connected to the controller 170. The hydraulic system 180 may include one or more proportional valves, blocking valves, fluid reservoirs, such as tanks and/or accumulators, and/or hydraulic lines.

Figure 4:
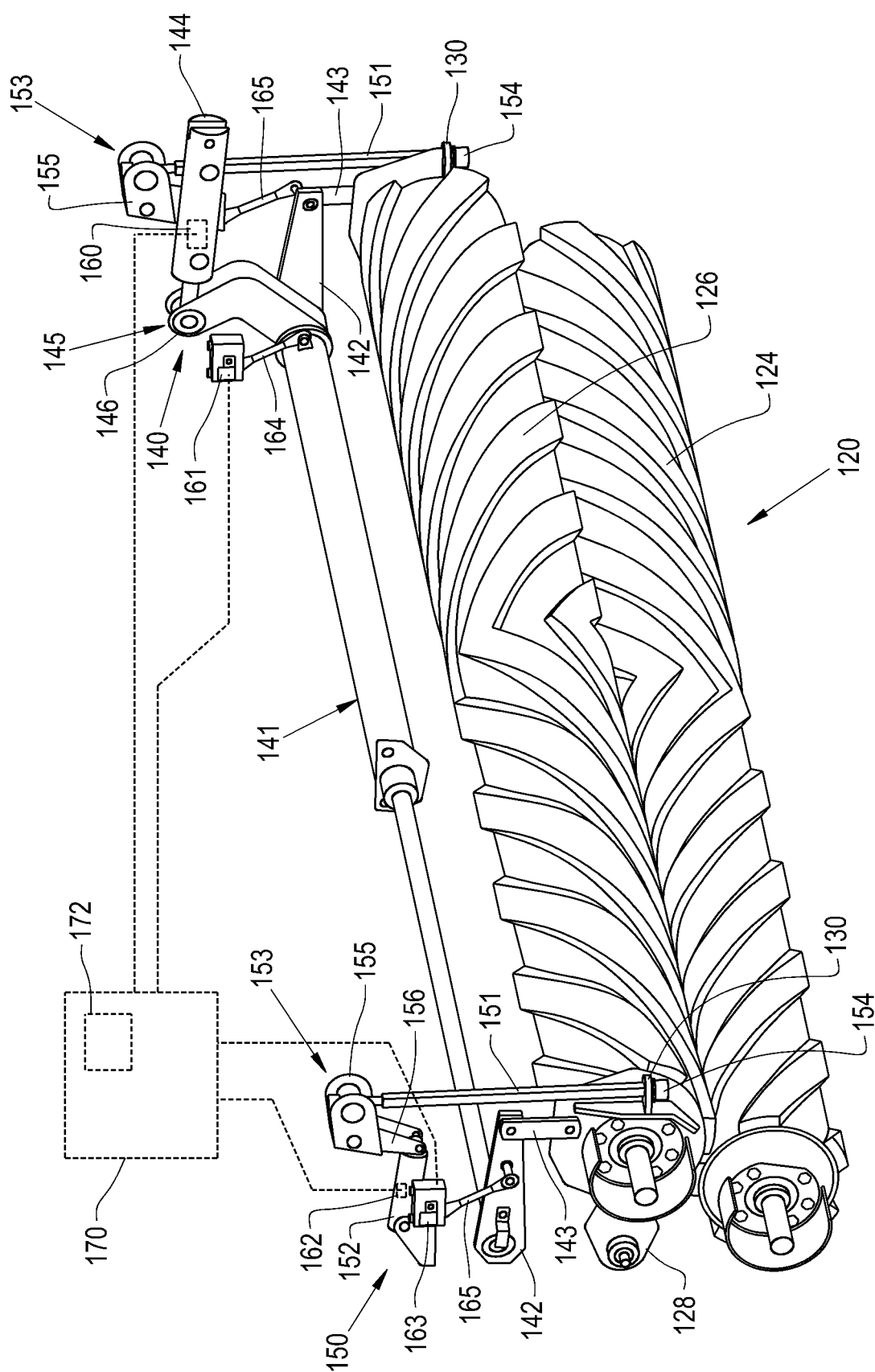
FIG. 4 illustrates a perspective view of the crop conditioning device of FIGS. 1-3, wherein the tension mechanism is applying maximum roll tension on the conditioning rolls.
Figure 5:
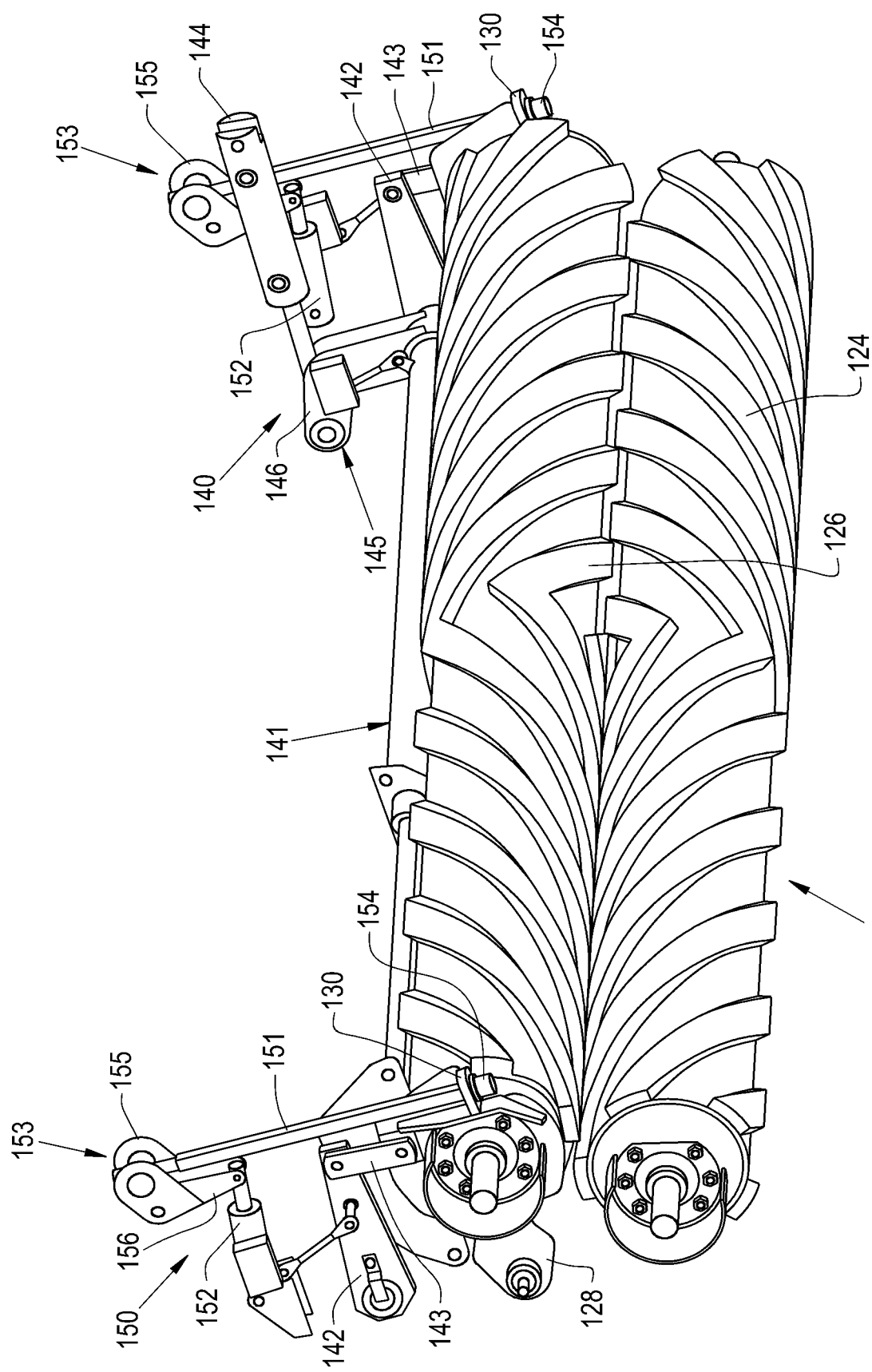
FIG. 5 illustrates a perspective view of the crop conditioning device of FIGS. 1-4, wherein the roll-gap mechanism has set a maximum roll gap size on one side of the conditioning rolls.

The one or more sensors 160, 161, 162, 163 may include at least one tension sensor 160, 161 associated with the tension actuator 144 and at least one roll-gap sensor 162, 163 associated with each roll-gap actuator 152 (FIGS. 1-4). For example, the at least one tension sensor 160, 161 may include a position sensor 160 located within the tension actuator 144 and/or a position sensor 161, e.g. potentiometer 161, operably connected to the tension member 141 via a link 164 (FIG. 4). The position sensor 160 may sense the position of the tension actuator 144. The potentiometer 161 may measure the rotation of the tension member 141. Also, for example, the at least one roll-gap sensor 162, 163 may include a position sensor 162 located within each roll-gap actuator 152 and/or a position sensor 163, e.g. potentiometer 163, operably connected to each rigid arm 142, via a link 165. Each position sensor 162 may sense the position of its respective roll-gap actuator 152. Each potentiometer 163 may measure the rotational movement of the rigid arm 142, and thereby the translational movement of the upper conditioning roll 126. Upon receiving the signals from the potentiometers 163, the controller 170 may calculate the distance, i.e., roll gap RG, between the conditioning rolls 124, 126 based upon the measured rotation of the rigid arms 142. As can be appreciated, the sensors 160, 161, 162, 163 may be in the form of any desired sensors. It should be appreciated that the one or more sensors may only include the potentiometers 161, 163.

The controller 170 may be operably connected to the tension actuator 144, the roll-gap actuators 152, and the sensors 160, 161, 162, 163. The controller 170 may automatically adjust the tension actuator 144 to set the tension force and the roll-gap actuators 152 to set the roll gap RG upon receiving an input command from the operator and/or a signal from one or more of the sensors 160, 161, 162, 163. For example, the operator may input a desired amount of tension force or size of the roll gap RG, and the controller 170 may automatically and accordingly adjust the actuators 144, 152. The controller 170 may include a memory 172 for storing known tension forces and roll gap sizes associated with an operator's preferences and/or kind of crop being harvested. The controller 170 may be in the form of any desired controller. The controller 170 may be a standalone controller or incorporated into the existing hardware and/or software of the harvester 100.

Figure 8:
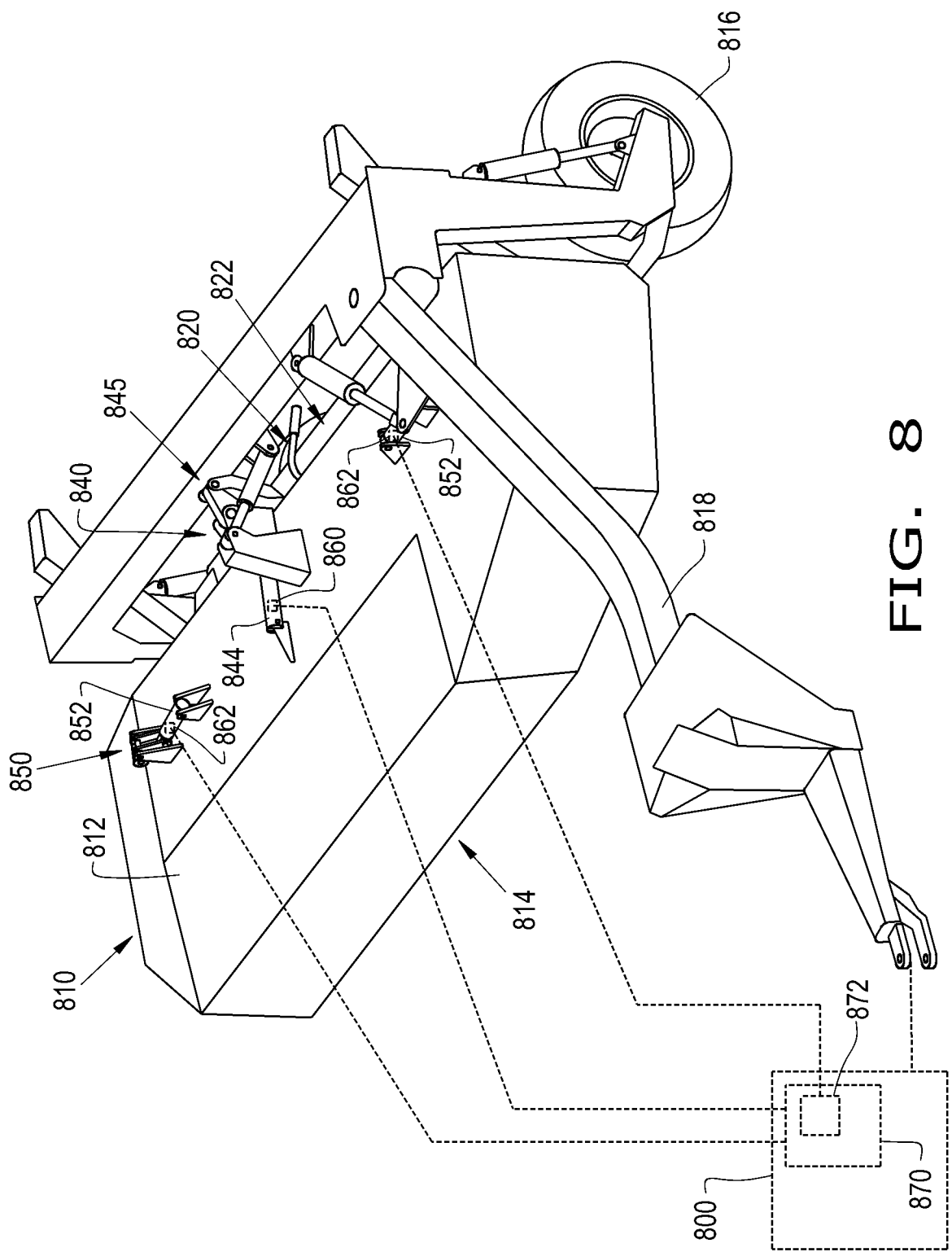
FIG. 8 illustrates a perspective view of an exemplary embodiment of a mower conditioner towable by an agricultural vehicle, the mower conditioner including a crop conditioning device, in accordance with an exemplary embodiment of the present invention.
Figure 9:
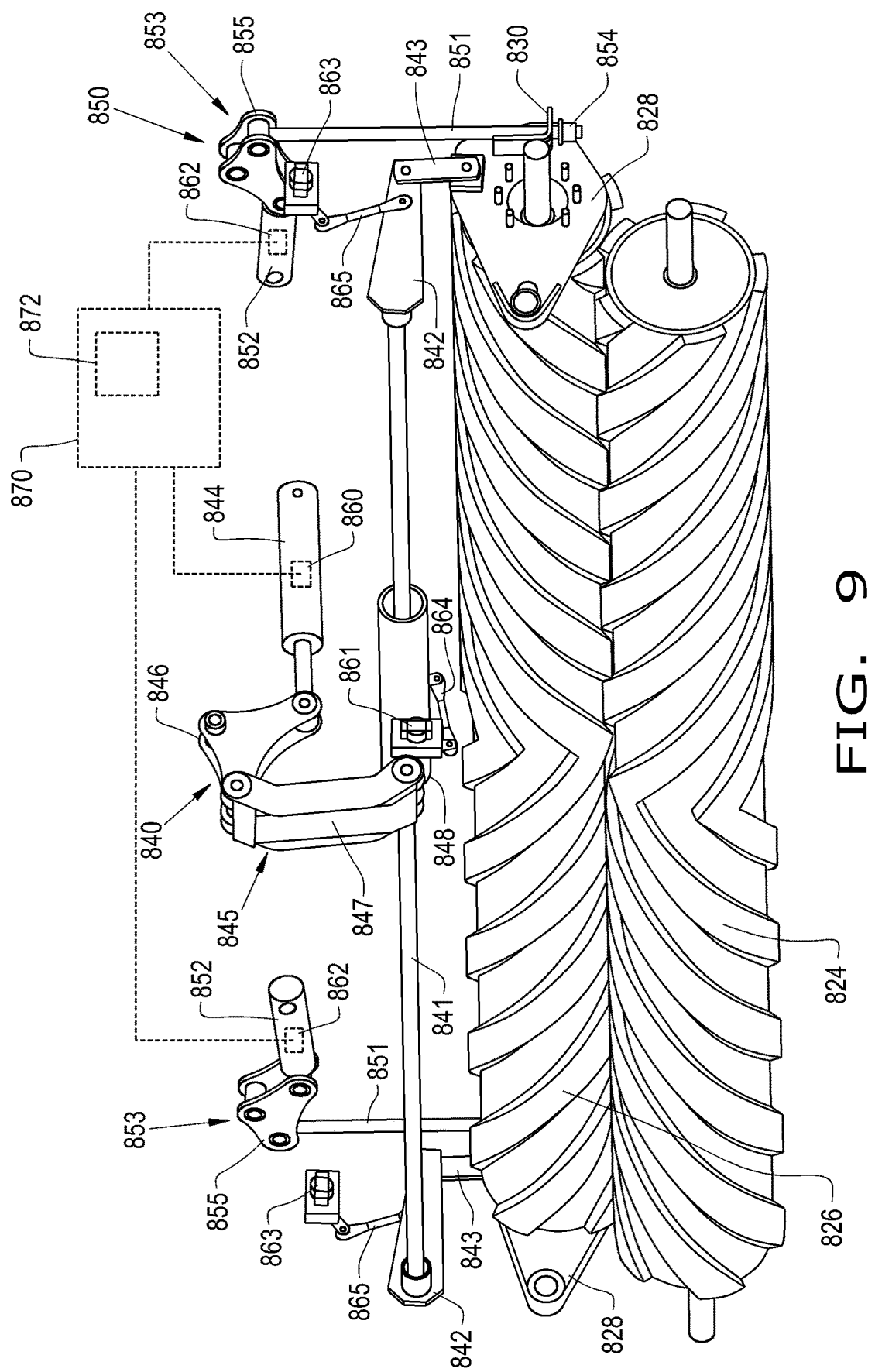
FIG. 9 illustrates a perspective view of the crop conditioning device of FIG. 8, the crop conditioning device including conditioner rolls, a tension mechanism, and a roll-gap mechanism.

Referring now to FIGS. 8-9, there is shown a pull-type mower conditioner 810 that is towable by an agricultural vehicle 800. The pull-type mower conditioner 810 may include a main frame 812, a cutter bar 814, wheels 816, and a tongue 818 for removably connecting to the agricultural vehicle 800. The pull-type mower condition 810 may also include a crop conditioning device 820, which is substantially similar to the crop conditioning device 120. Like elements between the crop conditioning device 120 and the crop conditioning device 820 have been identified with like reference characters, except with the 800 series designation. Thereby, the crop conditioning device 820 may generally include a subframe 822, at least two conditioning rolls 824, 826, a tension mechanism 840, a roll-gap mechanism 850, one or more sensors 860, 861, 862, 863, and a controller 870. It should be appreciated that the mower conditioner 810 may also include a hydraulic system, as discussed above.

It is noted that due to the structural differences between the mower conditioner 810 and the header 110, the tension mechanism 840 may include a linkage mechanism 845 with one or more links 846, 847, 848. The upper link 846 is pivotally connected to the tension actuator 844. The upper link 846 may also be pivotally connected to the main frame 812. The upper link 846 may be in the form of a bell crank 846. The intermediary link 847 is pivotally connected in between the upper link 846 and the lower link 848. The lower link 848 is pivotally connected in between the intermediary link 847 and the tension member 841. Also, each linkage mechanism 853 of the roll-gap adjustment device 850 may include one or more links 855, for example one link 855 which is pivotally connected to the main frame 812, its respective roll-gap actuator 852, and its respective control rod 851.

It should be appreciated that the actuators 144, 152, 844, 852 of either crop conditioning device 120, 820 may be reconfigured depending upon the geometry of the header 110 and/or the mower conditioner 810. For example, the actuators 144, 152, 844, 852 may be reconfigured for reverse operation, wherein the actuators 144, 152, 844, 852 retract instead of extend in order to increase the tension force or the roll gap size.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A crop conditioning device for an agricultural harvesting machine, comprising:
a frame;
a first conditioning roll connected to the frame;
a second conditioning roll pivotally connected to the frame such that the second conditioning roll is movable relative to the first conditioning roll, the second conditioning roll being located at a distance away from the first conditioning roll for defining a roll gap in between the first conditioning roll and the second conditioning roll, the second conditioning roll comprising a pair of lateral ends;
a tension member operably connected to the second conditioning roll, the tension member being configured for applying a tension force on the second conditioning roll;
a tension actuator operably connected to the tension member, the tension actuator being configured for adjusting the tension force applied by the tension member;
a pair of control rods respectively connected to the pair of lateral ends of the second conditioning roll;
a pair of roll-gap actuators respectively and operably connected to the pair of control rods, the pair of roll-gap actuators being configured for pivoting the second conditioning roll to adjust the roll gap;
wherein each lateral end of the pair of lateral ends of the second conditioning roll comprises a slider coupling, wherein the slider couplings of the pair of lateral ends slidably connect the second conditioning roll to the pair of control rods; and
wherein each control rod of the pair of control rods comprises an end member for engaging with a respective slider coupling, each of the end members defining a mechanical stop for setting a bottom limit of travel of the second conditioning roll.

2. The crop conditioning device of claim 1, wherein the second conditioning roll is configured for upwardly floating relative to the end members of the pair of control rods independent of the roll-gap actuators.

3. The crop conditioning device of claim 1, further comprising a pair of rigid arms respectively connected to each end of the tension member and a pair of pivot arms respectively and pivotally connected in between the pair of rigid arms and the pair of lateral ends of the second conditioning roll for operably connecting the second conditioning roll to the tension member.

4. The crop conditioning device of claim 3, wherein the tension actuator is configured for dually adjusting the tension force and the roll gap due to the second conditioning roll being operably connected to the tension member.

5. The crop conditioning device of claim 1, further comprising at least one tension sensor associated with the tension actuator, the at least one tension sensor being configured for measuring the tension force, at least two roll-gap sensors respectively associated with the roll-gap actuators, the at least two roll-gap sensors being configured for measuring the roll gap, and a controller operably connected to the tension actuator, the pair of roll-gap actuators, the at least one tension sensor, and the at least two roll-gap sensors, and the controller is configured for automatically adjusting the tension actuator to set the tension force and the roll-gap actuators to set the roll gap.

6. An agricultural harvester, comprising:
a chassis; and
a header connected to the chassis, the header comprising a cutter bar configured for cutting a crop material from a field and a crop conditioning device configured for conditioning the crop material, the crop conditioning device comprising:
a frame;
a first conditioning roll connected to the frame;
a second conditioning roll pivotally connected to the frame such that the second conditioning roll is movable relative to the first conditioning roll, the second conditioning roll being located at a distance away from the first conditioning roll for defining a roll gap in between the first conditioning roll and the second conditioning roll, the second conditioning roll comprising a pair of lateral ends;
a tension member operably connected to the second conditioning roll, the tension member being configured for applying a tension force on the second conditioning roll;
a tension actuator operably connected to the tension member, the tension actuator being configured for adjusting the tension force applied by the tension member;
a pair of control rods respectively connected to the pair of lateral ends of the second conditioning roll;
a pair of roll-gap actuators respectively and operably connected to the pair of control rods, the pair of roll-gap actuators being configured for pivoting the second conditioning roll to adjust the roll gap
wherein each lateral end of the pair of lateral ends of the second conditioning roll comprises a slider coupling, wherein the slider couplings of the pair of lateral ends slidably connect the second conditioning roll to the pair of control rods; and
wherein each control rod of the pair of control rods comprises an end member for engaging with a respective slider coupling, each of the end members defining a mechanical stop for setting a bottom limit of travel of the second conditioning roll.

7. The agricultural harvester of claim 6, wherein the second conditioning roll is configured for upwardly floating relative to the end members of the pair of control rods independent of the roll-gap actuators.

8. The agricultural harvester of claim 6, wherein the crop conditioning device further comprises a pair of rigid arms respectively connected to each end of the tension member and a pair of pivot arms respectively and pivotally connected in between the pair of rigid arms and the pair of lateral ends of the second conditioning roll for operably connecting the second conditioning roll to the tension member.

9. The agricultural harvester of claim 8, wherein the tension actuator is configured for dually adjusting the tension force and the roll gap due to the second conditioning roll being operably connected to the tension member.

10. The agricultural harvester of claim 6, further comprising at least one tension sensor associated with the tension actuator, the at least one tension sensor being configured for measuring the tension force, at least two roll-gap sensors respectively associated with the roll-gap actuators, the at least two roll-gap sensors being configured for measuring the roll gap, and a controller operably connected to the tension actuator, the pair of roll-gap actuators, the at least one tension sensor, and the at least two roll-gap sensors, and the controller is configured for automatically adjusting the tension actuator to set the tension force and the roll-gap actuators to set the roll gap.

11. A mower conditioner configured for being towed behind an agricultural vehicle, comprising:
  a cutter bar configured for cutting a crop material from a field; and
  a crop conditioning device configured for conditioning the crop material, the crop conditioning device comprising:
    a frame;
    a first conditioning roll connected to the frame;
    a second conditioning roll pivotally connected to the frame such that the second conditioning roll is movable relative to the first conditioning roll, the second conditioning roll being located at a distance away from the first conditioning roll for defining a roll gap in between the first conditioning roll and the second conditioning roll, the second conditioning roll comprising a pair of lateral ends;
    a tension member operably connected to the second conditioning roll, the tension member being configured for applying a tension force on the second conditioning roll;
    a tension actuator operably connected to the tension member, the tension actuator being configured for adjusting the tension force applied by the tension member;
    a pair of control rods respectively connected to the pair of lateral ends of the second conditioning roll; and
    a pair of roll-gap actuators respectively and operably connected to the pair of control rods, the pair of roll-gap actuators being configured for pivoting the second conditioning roll to adjust the roll gap;
    wherein each lateral end of the pair of lateral ends of the second conditioning roll comprises a slider coupling, wherein the slider couplings of the pair of lateral ends slidably connect the second conditioning roll to the pair of control rods; and
  wherein each control rod of the pair of control rods comprises an end member for engaging with a respective slider coupling, each of the end members defining a mechanical stop for setting a bottom limit of travel of the second conditioning roll.

12. The mower conditioner of claim 11, wherein the second conditioning roll is configured for upwardly floating relative to the end members of the pair of control rods independent of the roll-gap actuators.

13. The mower conditioner of claim 11, wherein the crop conditioning device further comprises a pair of rigid arms respectively connected to each end of the tension member and a pair of pivot arms respectively and pivotally connected in between the pair of rigid arms and the pair of lateral ends of the second conditioning roll for operably connecting the second conditioning roll to the tension member.

14. The mower conditioner of claim 13, wherein the tension actuator is configured for dually adjusting the tension force and the roll gap due to the second conditioning roll being operably connected to the tension member.

* * * * *